United States Patent [19]

Sanders

[11] Patent Number: 5,056,607

[45] Date of Patent: Oct. 15, 1991

[54] MODE CHANGE MECHANISM FOR POWER TOOLS

[75] Inventor: Anthony J. Sanders, Newton Aycliffe, England

[73] Assignee: Black & Decker Inc., Newark, Del.

[21] Appl. No.: 523,225

[22] Filed: May 14, 1990

[30] Foreign Application Priority Data

May 25, 1989 [GB] United Kingdom ................. 8912066

[51] Int. Cl.[5] ........................ B23B 45/16; F16H 37/16

[52] U.S. Cl. ........................................ 173/48; 173/109; 173/163

[58] Field of Search ................. 173/48, 163, 104, 109; 408/17

[56] References Cited

U.S. PATENT DOCUMENTS

| | | | |
|---|---|---|---|
| 3,006,202 | 10/1961 | Moorehead | 173/48 |
| 3,835,715 | 9/1974 | Howell | 173/48 |
| 4,189,011 | 2/1980 | Eberle | 173/48 X |
| 4,232,749 | 11/1980 | Rohrbach | 173/48 |
| 4,489,792 | 12/1984 | Fahim et al. | 173/48 |
| 4,567,950 | 2/1986 | Fushiya et al. | 173/48 |

FOREIGN PATENT DOCUMENTS

| | | | |
|---|---|---|---|
| 684169 | 4/1964 | Canada | 173/48 |
| 2557118 | 6/1977 | Fed. Rep. of Germany | 173/48 |
| 3115419 | 11/1982 | Fed. Rep. of Germany . | |
| 467143 | 2/1969 | Switzerland . | |

*Primary Examiner*—Mark Rosenbaum
*Assistant Examiner*—Rinaldi Rada
*Attorney, Agent, or Firm*—Dennis A. Dearing; Charles E. Yocum; Edward D. C. Bartlett

[57] ABSTRACT

A power drill has a mode changing mechanism enabling the drill to be operated selectively in a hammer mode and a non-hammer mode. Pivotally mounted upon an internal partition of the drill is a mode changing mechanism comprising a first rigid limb and a second limb consisting of a leaf spring located in side-by-side relationship with the first limb. The mechanism is pivotable into a first position in which the rigid limb is directly behind the output shaft of the drill so preventing rearward movement of the shaft and enabling the drill to operate in a non-hammer mode, and a second position in which the leaf spring is directly behind the output shaft so allowing rearward movement of the shaft and enabling the drill to operate in a hammer mode.

18 Claims, 6 Drawing Sheets

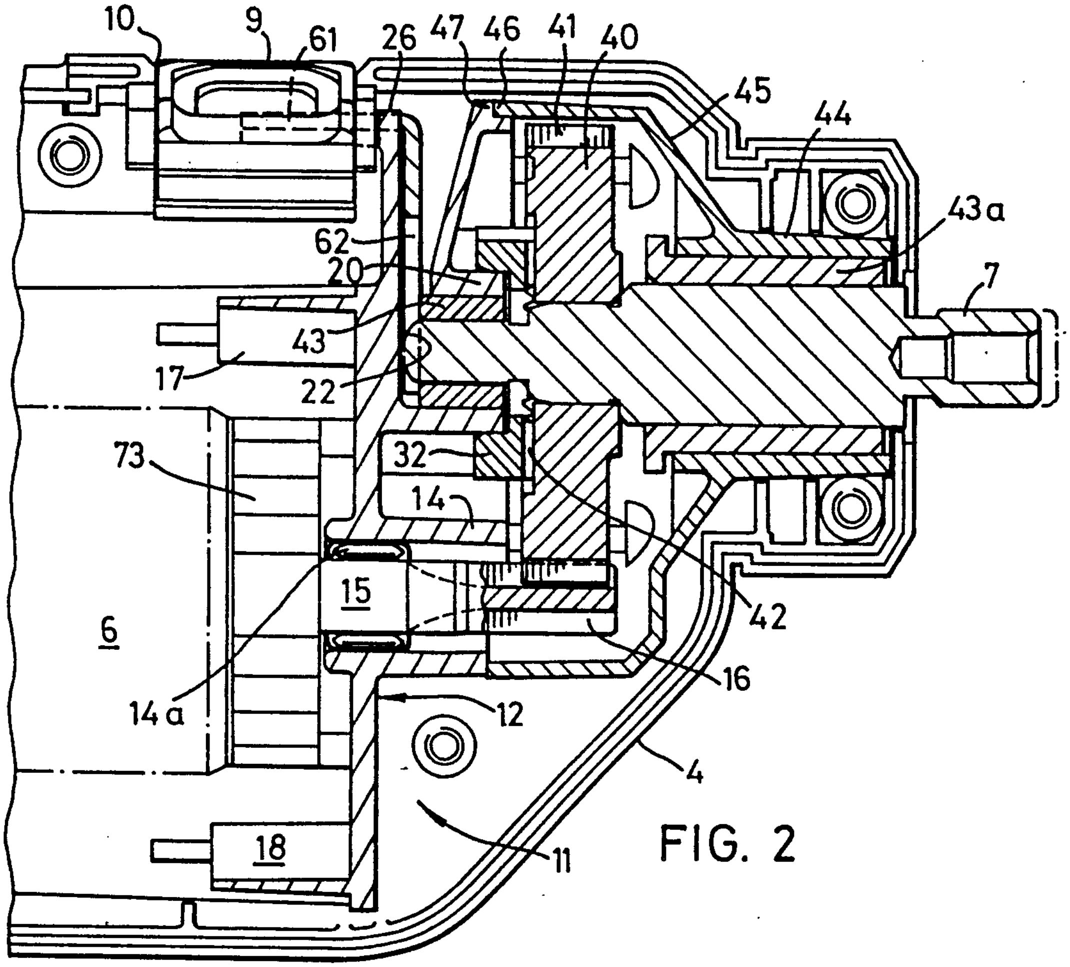
FIG. 2
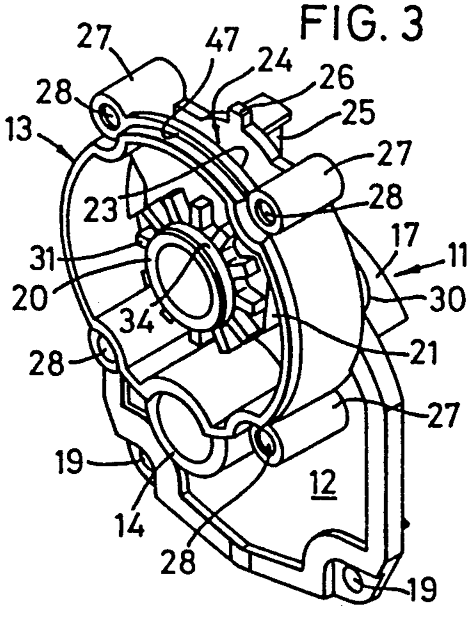
FIG. 3
FIG. 4
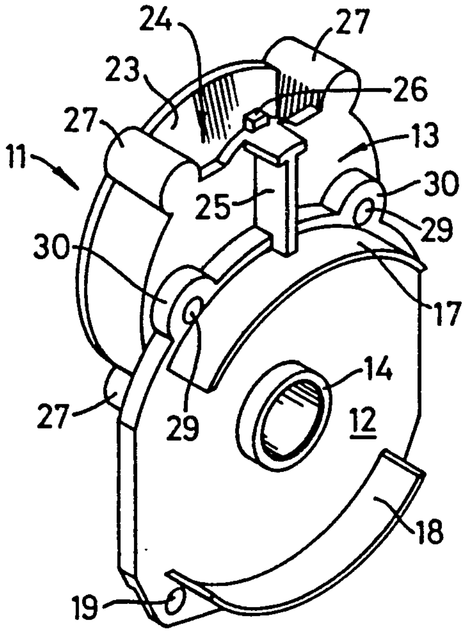

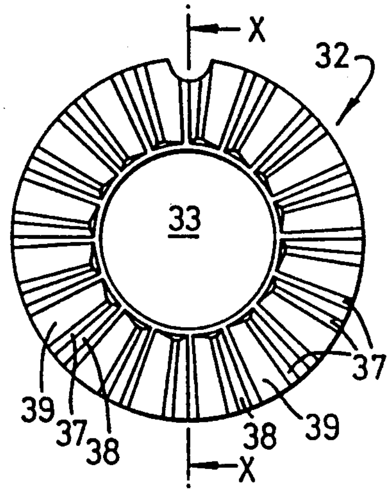
FIG. 9
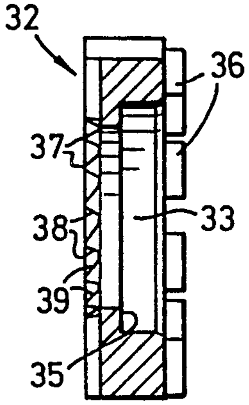
FIG. 10
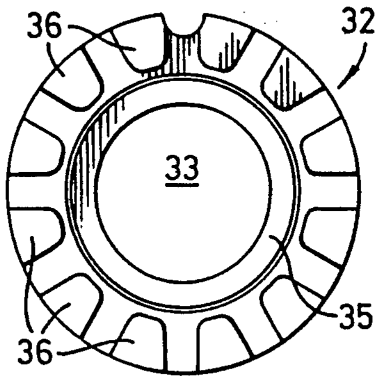
FIG. 11
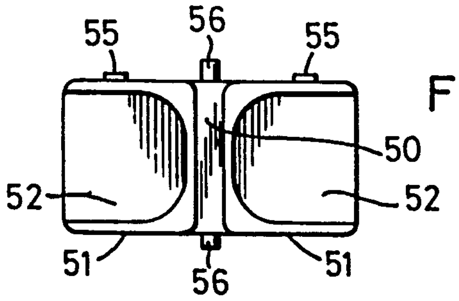
FIG. 12
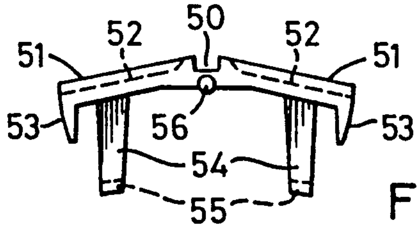
FIG. 13
FIG. 14
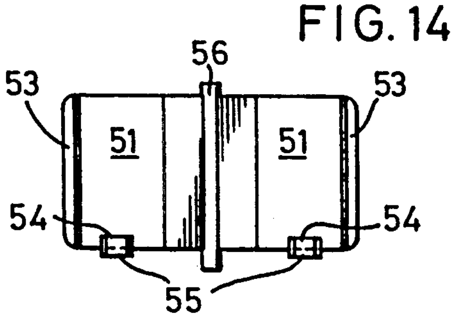

MODE CHANGE MECHANISM FOR POWER TOOLS

FIELD OF THE INVENTION

This invention relates to power tools and has particular although not exclusive reference to hand-held power hammer drills, and to a mode change mechanism for hammer drills.

SUMMARY OF THE INVENTION

According to the broadest aspect of the present invention, we provide a power drill having a mode changing mechanism for changing the operating condition of the drill between a hammer mode and a non-hammer mode, the mechanism comprising a first rigid member and a second non-rigid member, a common support carrying both members and movable between a first position in which the drill operates in the hammer mode and a second position in which the drill operates in a non-hammer mode.

Also according to the present invention, we provide a power drill including an output shaft with a tool bit holder at the outer end of the shaft, bearings for supporting the shaft for rotary and limited axial movement, and a mode change mechanism for changing the operating condition of the drill between a non-hammer mode and a hammer mode, the mode change mechanism comprising a first rigid member and a second resilient member, the members being carried by a common support movable between a first position in which the rigid member is aligned with the output shaft to prevent axial movement of the shaft and a second position in which the resilient member is aligned with the output shaft to allow axial movement of the shaft.

Preferably, the first rigid member is carried by a support mounted upon an internal partition of the drill, the support being movable between the first position which allows the drill to operate in a hammer mode and the second position which allows the drill to operate in the non-hammer mode, and in which the first rigid member is supported by the internal partition against rearward movement.

Preferably, the internal partition comprises a mounting for a fixed ratchet member, and a bearing in which one end of the output shaft is rotatably supported, the shaft carrying a second ratchet member cooperable with the first ratchet member to oscillate the shaft along its axis when the drill is operating in the hammer mode.

Preferably, the internal partition includes a pocket, the first rigid member and the second resilient member being located in the pocket, and one end of the output shaft projects into the pocket. The common support is preferably pivotally mounted upon the internal partition. It is preferred that the common support is of T-shape, with the vertical limb of the T being of two-part construction, of which one part is the first rigid member and the second part is the second resilient member.

Preferably, the second resilient member is a leaf spring secured to the common support in side-by-side relationship with the first rigid member.

The internal partition may be one wall of an enclosure which houses the first and second ratchet members. It is also preferred that the drill drive motor has an armature shaft rotatably supported at one end in a bearing carried by the internal partition.

BRIEF DESCRIPTION OF THE DRAWINGS

By way of example only, a hammer drill embodying the invention will now be described in greater detail with reference to the accompanying drawings, in which:

FIG. 2 is a section in a vertical plane through the front part only of the drill shown in FIG. 1, without the drill chuck, FIGS. 3 and 4 are front and rear perspective views of a component of the drill, FIG. 9 is a front view of another component of the drill, FIG. 10 is a section on the line X—X of FIG. 9, FIG. 11 is a rear view of the component of FIG. 9, FIGS. 12, 13 and 14 are, respectively, plan view, end view, and underneath view of a further component.

DETAILED DESCRIPTION OF THE PREFERRED EMBODIMENT

Figure 1:
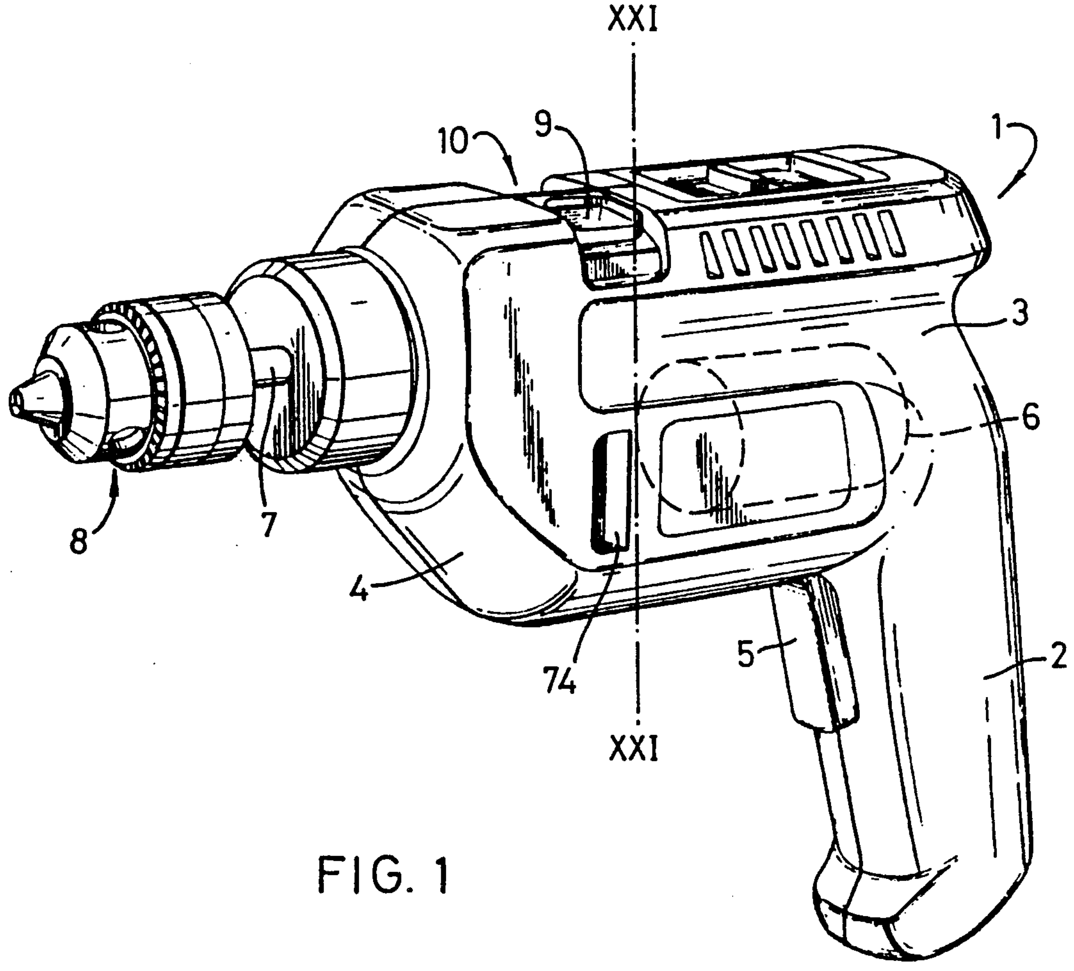
FIG. 1 is a perspective view of the drill.

The hammer drill shown in FIG. 1 is of generally conventional shape. It comprises a housing 1 of 2-part clam-shell construction formed with a handle 2, a body part 3 and a nose part 4. Mounted in the handle is a trigger 5 that operates an ON/OFF switch which controls the power supply to an electric motor indicated by dotted lines 6 accommodated in the body part 3. Extending from the nose part 4 is an output shaft 7 carrying a chuck 8.

The motor 6 is supported within the body part 3 by ribs formed on the internal faces of the clam shells. The body part 3 is separated from the nose part 4 by an internal gear case rear partition formed as a metal casting and described in more detail below. The nose portion 4 accommodates reduction gears which reduce the motor speed to a desired chuck speed. The reduction gears are housed within a gear case formed by the gear case rear partition and a gear case cover which fits against the partition and will be described in more detail below.

Mounted upon the gear case rear partition is a mode change mechanism that will be described in more detail below and which enables the drill to be used in a hammer or a non-hammer mode. The mechanism is operated by an actuator 9 located in a recess 10 formed in the adjoining upper surfaces of the clam shells.

The gear case rear partition 11 is shown in perspective in FIGS. 3 and 4. It is a metal casting whose lower part 12 is of plate-like form. The upper part 13 is of shallow cup-like form, the base of the cup overlapping slightly the front face of the part 12.

The part 12 is formed with a central sleeve 14 that extends outwardly from both faces of the part. The sleeve 14 accommodates a needle bearing 14*a* (FIG. 2) which supports the forward end part of the armature shaft 15 of the motor 6. The forward end of the shaft is machined to form a pinion 16.

Extending from the rear face of the part 12 are upper and lower arcuate walls 17, 18 whose function will be described below. Screw holes 19 in the lower corners of the part 12 are provided for screws which secure the partition to bosses formed on the inside faces of the clam shells.

Figure 5:
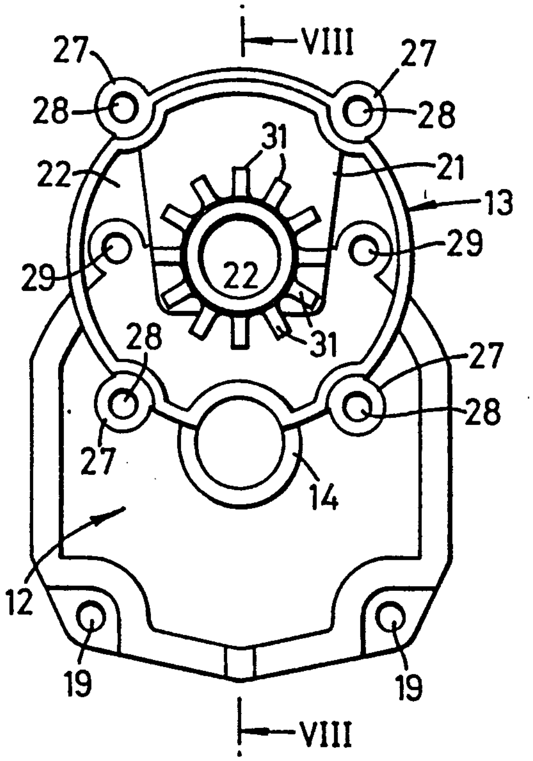
FIGS. 5 and 6 are, respectively, a front and side elevation of the component of FIGS. 3 and 4.
Figure 6:
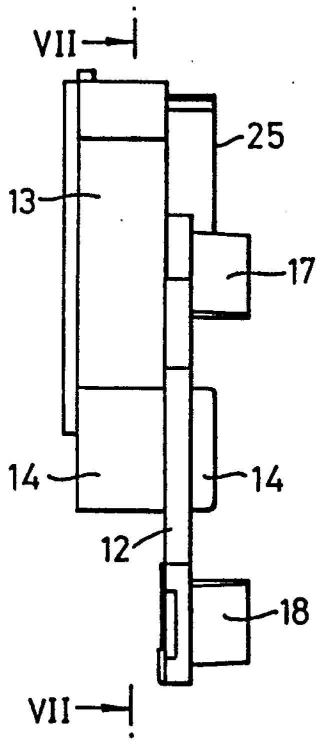
Figure 7:
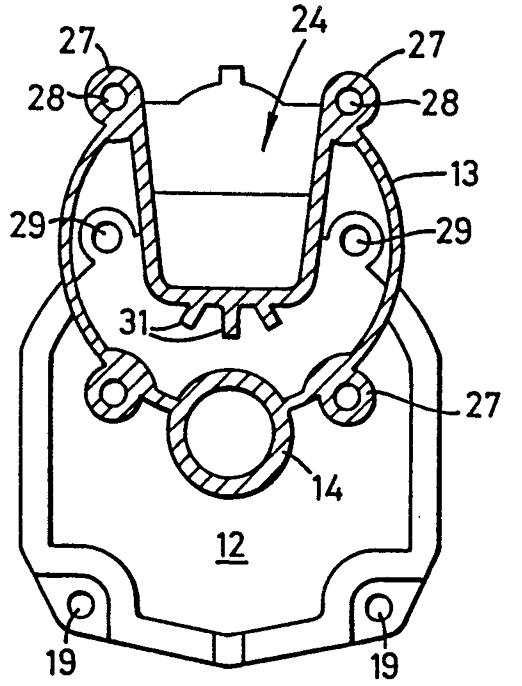
FIG. 7 is a section on the line VII—VII of FIG. 6.
Figure 8:
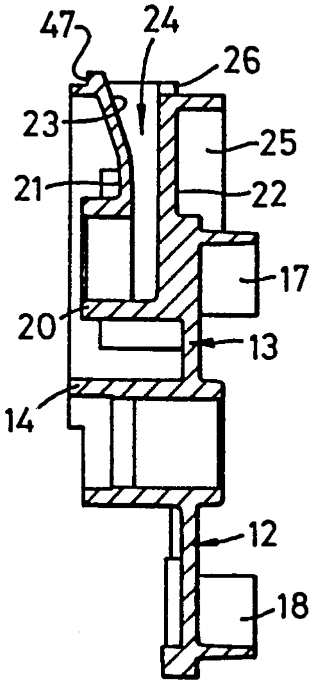
FIG. 8 is a section on the line VIII—VIII of FIG. 5.

Centrally located within the part 13 is a sleeve 20 which extends from a raised portion 21 of the floow 22 of the part 13. The portion 21 is of generally rectangular form when seen in elevation as in FIG. 5, its upper part 23 being inclined forwardly as seen in FIG. 8. There is thus formed an open-topped pocket 24 between the portion 21 and the floor 22. As can be seen from FIG. 8, the bore of the sleeve 20 opens into the pocket 24. The open end of the pocket lies in the curved wall of the cup-shaped part 13. The rear face of the floor 22 of the part 13 has an external diametral stiffening rib 25 of T-shape, there being a small stud 26 located on the horizontal arm of the T as seen in FIG. 4.

Four bosses 27 equi-spaced round the curved wall of the part 13 each have a central passage 28 closed at its inner end. Additional screw holes 29 in the base 22 extend through ears 30 on the upper edge of part 12.

Formed in the front face of the portion 21 are ribs 31 that extend radially outwards from the sleeve 20. These ribs form a key for a fixed ratchet 32 of a ratchet mechanism that provides the hammer action. The fixed ratchet has a central bore 33 therein of a size such that it can be pressed onto the outside of the sleeve 20 to locate the fixed ratchet.

The fixed ratchet 32 is shown in detail in FIGS. 9, 10 and 11, and is formed of metal and its central bore 33 accommodates that part 34 of the sleeve 20 that projects outwardly beyond the plane of the ribs 31. The bore 33 is stepped as at 35 (see FIG. 10), the step seating upon the end face of the sleeve 20.

On one circular face, the fixed ratchet 32 has a series of projections 36 equi-spaced round the periphery of the face which are dimensioned and spaced so that they fit between the ribs 31. The fixed ratchet 32 cannot therefore rotate relative to the partition 11.

On its other circular face, the fixed ratchet 32 has a series of spaced radially-extending teeth 37 each of which has inclined faces 38, 39. Faces 38 are inclined more sharply than faces 39 as can be seen from FIG. 10.

Cooperating with the fixed ratchet 32 is a rotary ratchet gear 40 secured to the inner end of the output shaft 7 and rotatable therewith as can be seen in FIG. 2. The periphery of ratchet gear 40 has teeth 41 which mesh with pinion 16 referred to above. One circular face of the rotary ratchet gear 40 is formed with radial ratchet teeth 42 of a configuration similar to that of teeth 37 on the fixed ratchet 32.

The inner end of the shaft 7 is rotatably supported in a plain bearing 43 located in sleeve 20 and, as can be seen from FIG. 2, the inner end of the shaft protrudes into the open-topped pocket 24.

The outer end of the shaft 7 is rotatably supported in a plain bearing 43*a* accommodated in a sleeve 44 which projects forwardly of a gear box front wall 45. The wall 45 is contoured, as seen in FIG. 2, to accommodate the fixed and rotatable ratchets 32, 40 and the pinion 16. The front wall 45 has an inner edge 46 that seats against a stepped edge 47 of the casting and formed round the curved wall of the cup-like part 13 of the partition 11.

The front wall 45 is secured to the partition 11 by screws which pass through holes in the front wall that are aligned with the bosses 27 and which screw into the passages 28 in those bosses.

Accommodated within the pocket 24 is a mode change mechanism actuable by the actuator 9 referred to above.

Figure 21:
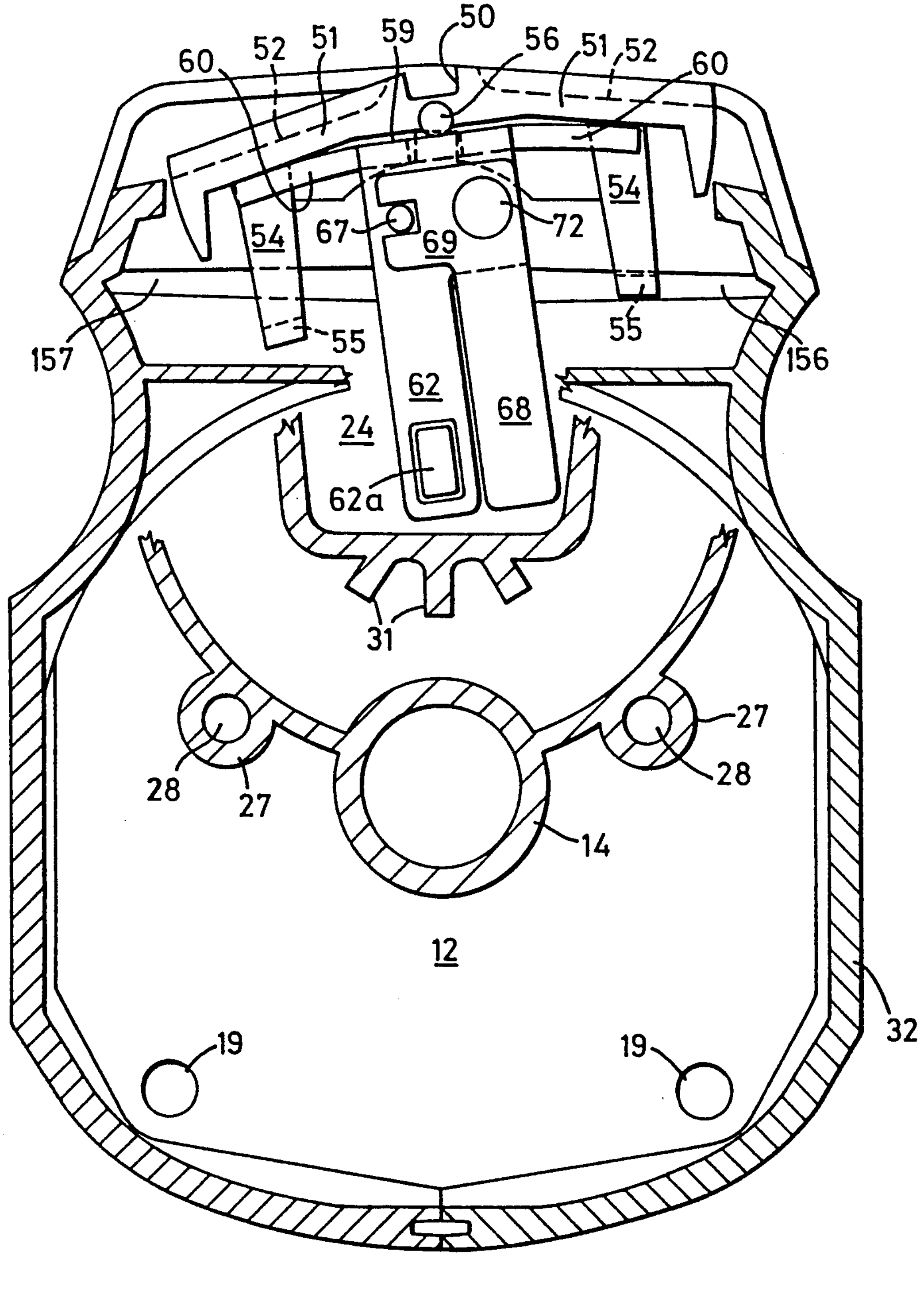
FIG. 21 is a section on a larger scale through the drill on a vertical plane represented by the line XXI—XXI of FIG. 1.

The actuator 9 shown in FIGS. 12, 13 and 14 is a moulded plastics component (e.g. of ABS) of generally rectangular form when seen in plan as in FIG. 12. The actuator has a transverse groove 50 across its central area and arms 51 that incline downwardly slightly as can be seen in FIG. 13. The upper surfaces—those seen in FIG. 12—of the arms 51 are recessed centrally as indicated at 52 to facilitate actuation thereof by a user. Extending downwardly from the ends of the arms 51 are tips 53 which extend across the full width of the arms. Each arm 51 also carries a prong 54 that extends away from the arm in the same direction as the tips 53. The ends of the prongs 54 are out-turned as indicated at 55. As can be seen in FIG. 21, these out-turned end 55 locate in detent grooves 156, 157, in the clam shell, to hold the actuator either in a hammer or a non-hammer mode, depending on which way it is rocked.

Formed integrally with the actuator 9 and on the undersurface thereof is a transverse spindle 56 by means of which the actuator 9 is pivotally mounted in the clam shell halves.

Positioned below the actuator 9 is a thrust plate assembly comprising a thrust plate 57 and a leaf spring 58 shown in FIGS. 18, 19 and 20.

Figure 16:
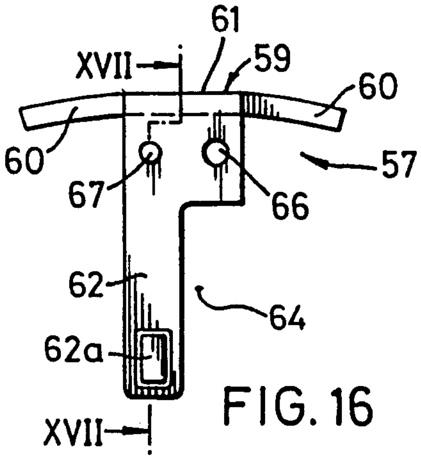
FIGS. 15, 16 and 17 are, respectively, plan view, end view, and section on line XVII—XVII of FIG. 16 of a further part.
Figure 17:
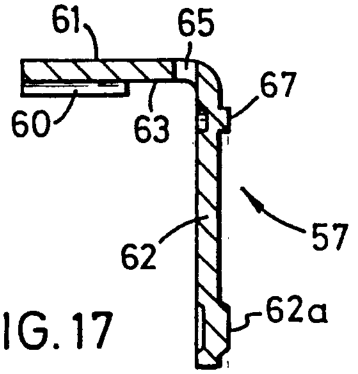
Figure 15:
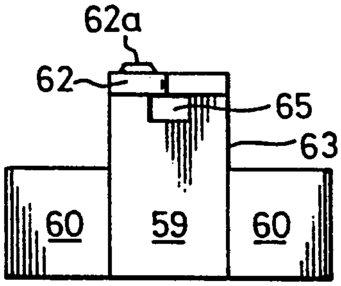

The thrust plate 57 shown in FIGS. 15, 16 and 17 is made from steel plate and is of generally T-shape when seen in end view as in FIG. 16. The head 59 of the plate 57 is generally rectangular as shown in FIG. 15, the limbs 60 of the head being inclined downwardly slightly from a flat central area 61. The inclination corresponds with that of the arms 51 of the actuator 9.

The vertical limb 62 of the thrust plate 57 is part of a central extension 63 of the area 61 and is cut away as indicated at 64 to receive the leaf spring as will be described below in more detail. At its free end, it is thickened up by a pressing operation to provide a radiused, projecting stud or pad 62*a*. The extension 63 has a rectangular hole 65 in it, and there is a circular hole 66 in the limb 62 immediately above the cut-away part 64. A small stud 67 located adjacent to the hole 66 forms a location pin for the leaf spring shown in FIGS. 18, 19 and 20.

The leaf spring 58 is made of thin spring steel and is of elongate form having a portion 68 sized to correspond with the cut away 64 and a portion 69 whose width approximates to that of the upper part of the limb 62 of the thrust plate 57.

The portion 69 is slotted as at 70 and adjacent the slot is a circular hole 71.

To mount the leaf spring 58 on the thrust plate 57, the spring is slid over the surface of the plate to engage the stud 67 in the slot 70 and to align the hole 66 in the limb 62 with the hole 71. The spring is then secured to the thrust plate by a rivet 72 passed through the holes 71 and 66 from right to left as viewed in FIG. 20.

Figure 20:
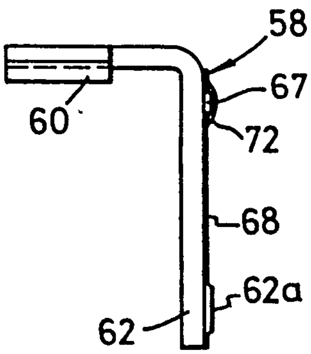

As can be seen from FIG. 20, the thickness of the limb 62 is considerable as compared with that of the leaf spring 58 and thus the leaf spring is able to flex within the depth of the cut-away portion 64 of the thrust plate.

Figure 18:
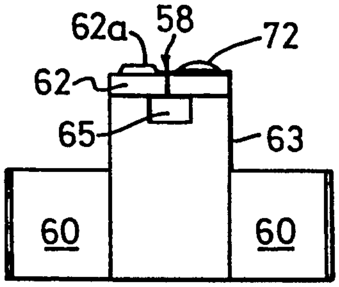
FIGS. 18, 19 and 20 are, respectively, plan view, end view and side view of an assembly of parts.
Figure 19:
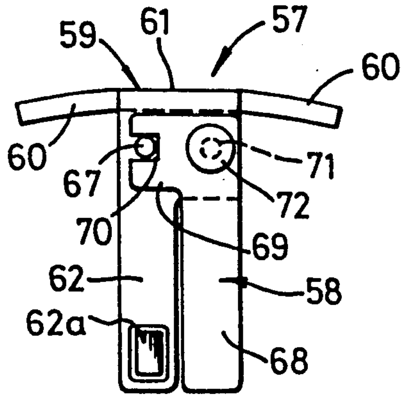

To mount the mode change mechanism, the assembly shown in FIGS. 18, 19 and 20 is inserted into the pocket 24, the limb 62 and spring 68 entering first. The stud 26 locates loosely in the hole 65 so pivotally mounting the assembly. When so mounted, the limb 62 and spring 58 lie closely adjacent to the floor 22 of the part 13 of the partition.

The actuator 9 is then placed over the assembly (see FIG. 21) so that the head 59 and limbs 60 are located beneath the arms 51 of the actuator head, the prongs 54 lying externally of the assembly and of the inclined part 23 of partition 21 of the pocket, with the out-turned ends 55 in contact with the rear face of the floor 22 thereby acting to guide the actuator during movement. The ends of the spindle 56 on the actuator 9 locate in bearing slots in the clam shell halves.

The mode change mechanism is thus pivotable by a user between the position shown in FIG. 21 in which the pad 62a on the limb 62 of the thrust plate lies directly behind the sleeve 20 in the part 13 of the rear wall 11 and a position in which the leaf spring 58 lies behind that sleeve.

As is conventional in hammer drills, the output shaft 7 is movable axially over a short distance and is shown in its rearward position in FIG. 2. In that position, the teeth 37 on the fixed ratchet 32 are in engagement with the teeth 42 on the movable ratchet 40 secured to the output shaft 7. In moving rearwardly, the shaft 7 has flexed the leaf spring rearwardly into the cut-away 64.

In its forward position, the output shaft 7 is so located that the teeth on the movable ratchet 40 are out of contact with the teeth on the fixed ratchet 32. To maintain the output shaft in that forward position when the drill is in use, the mode change mechanism is operated to the position in which the pad 62a on the limb 62 of the thrust plate lies directly behind the inner end of the output shaft 7 and prevents rearward movement of the latter. That position of the mode change mechanism is the non-hammer or drill only position.

When the mode change mechanism is rocked to its other position in which the leaf spring 58 lies directly behind the inner end of the output shaft 7, the latter is allowed to move rearwardly against the resilient action of the leaf spring 58 which flexes backwardly into the cut away 64 as is explained above.

It will be appreciated that the floor 22 of the part 13 supports the limb 62 when the drill, is in non-hammer mode use and this provides an improved resistance to axial movement of the spindle.

Mounted upon the armature shaft 15 adjacent to the partition 11 is a fan 73 which, in use, circulates cooling air through the motor 6 in a well-known manner. The output of the fan 73 is confined to some extent by the arcuate walls 17, 18 referred to above and directed thereby to atmosphere via vents in the clam shells. One of the vents is shown at 74 in FIG. 1. The walls 17, (18) also assist to locate the motor, and are designed to draw heat away from the ratchet area of casting, especially the top wall 17. It is important to cool the casting, as it gets very hot when the drill is being used in hammer mode. The walls also serve to strengthen the rear wall 12 of the casting. This is important to ensure the casting does not break if the drill should be dropped on its chuck.

It will of course be appreciated that the preferred embodiment of the present invention has been described above purely by way of example, modifications, and other alternative constructions, will be apparent which are within the spirit and scope of the invention as defined in the appended claims.

What is claimed is:

1. A power drill, comprising:
a housing;
an output shaft with a tool bit holder at an outer end of said shaft;
bearings for supporting the shaft in said housing for rotary and limited axial movement relative thereto;
a mode change mechanism for changing the operating condition of the drill between a non-hammer mode and a hammer mode;
said mode change mechanism comprising a first rigid member and a second resilient member, said members being carried by a common support movable between a first position in which said first rigid member is aligned with the output shaft to prevent axial movement of said shaft and a second position in which said second resilient member is aligned with the output shaft to allow axial movement of said shaft;
said common support being mounted upon an internal partition in said housing, and said first rigid member being supported against rearward movement by said internal partition when said common support is in said first position;
said internal partition including a mounting for a first ratchet member and a bearing in which one end of said output shaft is rotatably supported, said output shaft carrying a second ratchet member cooperable with said first ratchet member to impart a hammering action to said output shaft along its axis when the power drill is operating in said hammer mode; and
said internal partition including a pocket, said first rigid member and said second resilient member being located in said pocket, and said one end of the output shaft projecting into said pocket.

2. A power drill, comprising:
a housing;
an output shaft with a tool bit holder at an outer end of said shaft;
bearings for supporting the shaft in said housing for rotary and limited axial movement relative thereto;
a mode change mechanism for changing the operating condition of the drill between a non-hammer mode and a hammer mode;
said mode change mechanism comprising a first rigid member and a second resilient member, said members being carried by a common support movable between a first position in which said first rigid member is aligned with the output shaft to prevent axial movement of said shaft and a second position in which said second resilient member is aligned with the output shaft to allow axial movement of said shaft;
said common support being pivotally mounted upon an internal partition in said housing; and
said common support being of T-shape, a vertical limb of this T-shape being of two-part construction of which one part is said first rigid member and the second part is said second resilient member.

3. A power drill, comprising:
a housing;
an output shaft with a tool bit holder at an outer end of said shaft;
bearings for supporting the shaft in said housing for rotary and limited axial movement relative thereto;

a mode change mechanism for changing the operating condition of the drill between a non-hammer mode and a hammer mode;

said mode change mechanism comprising a first rigid member and a second resilient member, said members being carried by a common support movable between a first position in which said first rigid member is aligned with the output shaft to prevent axial movement of said shaft and a second position in which said second resilient member is aligned with the output shaft to allow axial movement of said shaft; and said second resilient member being a leaf spring secured to said common support in side-by-side relationship with said first rigid member.

4. The power drill as claimed in claim 3, wherein said common support is mounted upon an internal partition in said housing, and said first rigid member is supported against rearward movement by said internal partition when said common support is in said first position.

5. The power drill as claimed in claim 4, wherein said internal partition includes a mounting for a first ratchet member and a bearing in which one end of said output shaft is rotatably supported, said output shaft carrying a second ratchet member cooperable with said first ratchet member to impart a hammering action to said output shaft along its axis when the power drill is operating in said hammer mode.

6. The power drill as claimed in claim 5, wherein said internal partition is one wall of an enclosure which houses said first and second ratchet members.

7. The power drill as claimed in claim 6, wherein an armature shaft is rotatably supported at one end in a second bearing carried by said internal partition.

8. The power drill as claimed in claim 3, wherein said common support is pivotally mounted upon an internal partition in said housing.

9. The power drill as claimed in claim 3, wherein a pad is provided on said rigid member for alignment with said output shaft.

10. A power drill, comprising:

a housing;

an output shaft with a tool bit holder at an outer end of said shaft;

bearings for supporting the shaft in said housing for rotary and limited axial movement relative thereto;

a mode change mechanism for changing the operating condition of the drill between a non-hammer mode and a hammer mode;

said mode change mechanism comprising a first rigid member and a second resilient member, said members being carried by a common support movable between a first position in which said first rigid member is aligned with the output shaft to prevent axial movement of said shaft and a second position in which said second resilient member is aligned with the output shaft to allow axial movement of said shaft;

said common support being mounted upon an internal partition in said housing, and said first rigid member being supported against rearward movement by said internal partition when said common support is in said first position;

said internal partition including a mounting for a first ratchet member and a bearing in which one end of said output shaft is rotatably supported, said output shaft carrying a second ratchet member cooperable with said first ratchet member to impart a hammering action to said output shaft along its axis when the power drill is operating in said hammer mode;

said internal partition being one wall of an enclosure which houses said first and second ratchet members;

an armature shaft rotatably supported at one end in a second bearing carried by said internal partition; and said second ratchet member being a ratchet gear, and said one end of said armature shaft having a pinion in driving engagement with said ratchet gear.

11. In a hammer drill, a mode changing mechanism for changing the operating condition of the drill between a hammer mode and a non-hammer mode, the mechanism comprising:

a first rigid member and a second non-rigid member;

a common support carrying both said members and movable between a first position in which the hammer drill operates in the hammer mode and a second position in which the hammer drill operates in the non-hammer mode;

said common support being pivotally mounted in said hammer drill; and said nonrigid member comprising a resilient arm.

12. The mechanism of claim 11, wherein said resilient arm is a leaf spring, said rigid member comprises a rigid arm, and said leaf spring and said rigid arm extends alongside each other away from said common support.

13. A hammer drill having a mode changing mechanism for changing operation of the drill between a hammer mode and a non-hammer mode, the mode changing mechanism comprising:

a rigid member carried by a support mounted upon an internal partition of the hammer drill;

said support being movable between a first position which allows the hammer drill to operate in said hammer mode and a second position which allows the hammer drill to operate in said non-hammer mode;

said rigid member being supported by said internal partition against rearward movement when said support is in said second position;

a resilient member carried by said support, said resilient member being deformable by axial displacement of an output shaft of said hammer drill when said support is in said first position; and said resilient member being a leaf spring.

14. A hammer drill having a mode changing mechanism for changing operation of the drill between a hammer mode and a non-hammer mode, the mode changing mechanism comprising:

a rigid member carried by a support mounted upon an internal partition of the hammer drill;

said support being movable between a first position which allows the hammer drill to operate in said hammer mode and a second position which allows the hammer drill to operate in said non-hammer mode;

said rigid member being supported by said internal partition against rearward movement when said support is in said second position;

a resilient member carried by said support, said resilient member being deformable by axial displacement of an output shaft of said hammer drill when said support is in said first position; and said rigid member and said resilient member extending side-by-side away from said support, said output shaft contacting said rigid member and said resilient member, respectively, only in said non-hammer mode and said hammer mode, respectively.

15. The hammer drill of claim 14, wherein said rigid member has a cut-away part which accommodates flexing of said resilient member by said output shaft.

16. The hammer drill of claim 15, wherein a manually operable pivotal actuator is connected to said support, pivoting of said actuator effecting pivoting of said support between said first and second positions.

17. The hammer drill of claim 14, wherein said resilient member is a leaf spring.

18. A hammer drill, comprising:

a housing;

a mode changing mechanism pivotally mounted in said housing and enabling the drill to be operated selectively in a hammer mode or a non-hammer mode;

an output shaft mounted in said housing and displaceable axially in a rearward direction in said hammer mode;

said mode changing mechanism comprising a rigid limb and a resilient limb extending in side-by-side relationship;

said mode changing mechanism being pivotal into a first position in which said rigid limb is directly behind a rear end of said output shaft so preventing axial rearward displacement of said output shaft and enabling the drill to operate in said hammer mode; and said mode changing mechanism being pivotal into a second position in which said resilient limb is directly behind said rear end of said output shaft so allowing axial rearward displacement of said output shaft and enabling the drill to operate in said hammer mode.

* * * * *